Patented Apr. 3, 1934

1,953,892

UNITED STATES PATENT OFFICE 1,953,892

NONFIBROUS COMPOSITIONS

Howard L. Bender, Bloomfield, N. J., assignor to Bakelite Corporation, New York, N. Y., a corporation of Delaware No Drawing. Application May 17, 1929, Serial No. 363,993

1 Claim. (Cl. 154—2.6)

This invention relates to coated materials obtained by applying a varnish to a base material, and it is directed more particularly to the use of flexible base materials, such as the cellulose esters, regenerated cellulose or cellophane, pyroxylin, cellulose acetate, etc., and other materials whose surfaces preferably are substantially free from projecting fibers, and in the form of sheets, tubes, rods, threads, etc.

I have found that a base of this character with a non-fibrous surface can be satisfactorily coated with a resinoid varnish of the flexible type, such as for example, a phenolic resinoid varnish of the type described in Patent No. 1,590,079 to Byck, granted June 22, 1926, to yield a film that adheres with great firmness to the base, does not crack and whose flexibility is such that it does not impair this property of the base material. The coated product is characterized by a surprisingly high dielectric strength and for this reason and because of its flexibility, and the further properties of resistance to moisture, non-thermoplasticity, etc. characteristic of resinoids, that is, synthetic resinous substances convertible from an initial fusible to a final infusible state by heating, it is peculiarly adapted as insulation for cables, condensers, etc. and particularly where such apparatus is subjected to the action of heat.

The invention, however, is not restricted to the reacted phenol-oil resinoids of the Byck patent but lends itself to other resinoids having the property of flexibility. For instance, phenol resinoids made flexible by the inclusion of a plasticizing agent or synthetic resinoids of the glyptal, that is, the polybasic acid-polyhydric alcohol, type and of the phenol-urea type, which are desirable on account of their light color may be used. These are incorporated with suitable solvents to form varnishes.

The varnish can be and is preferably applied to the base material by dipping or running the latter through a bath of the varnish, the thickness of the film being regulated by the length of time of immersion. As the base material is withdrawn from the bath, it is directed vertically through a drying tower, or suspended therein, and a current of dry air is passed over it to accelerate the evaporation of the volatile solvents. The air current can be heated to further hasten the removal of solvents and also to react the resinoid to the desired degree.

The varnish may also be applied by rollers or by spraying as is customary in some types of coating work and these methods enable a coating to one or both sides as desired when a sheet or tube is being treated.

A specific example illustrative of the invention comprises passing a continuous sheet of regenerated cellulose, measuring 0.8 mils in thickness, through a bath of a varnish of the nature and consistency described by Byck in his patent, the immersion continuing for about a minute or less to give a sheet coated on both sides to a total thickness of about 2.0 mils. It is then led through a drying tower where it is contacted by air at a temperature of about 135° C. for about twenty minutes. As the sheet emerges from the tower, the films deposited thereon are found to be non-tacky, tough, to adhere with great firmness to the base, and to have a pleasing, uniform glossy surface. Furthermore, the distribution of the coating is sufficiently uniform and non-porous to permit usage where dielectric properties are of major importance, and samples taken from such a coated regenerated cellulose sheet have shown a dielectric strength of over 4000 volts or about 2000 volts per mil. When it is realized that materials now commonly used for electrical insulation have a dielectric strength of only a fraction of that here noted the commercial importance of a coated regenerated cellulose sheet in accordance with this invention in the manufacture of condensers, cables, and similar electrical apparatus is manifest.

The surprisingly high dielectrical resistance is not the only desirable property of regenerated cellulose or similar base material coated as herein described. The applied film being tough, non-fusible, resistant to water and usual solvents and likewise transparent, furnishes a surface protection for the non-fibrous surfaced sheet preventing its marring, oxidation and the like. The coated material is therefore suitable for automobile curtains, and similar uses.

While the base material is specifically referred to above as in the form of a sheet, the invention also includes within its scope the coating of non-fibrous surfaced materials in the form of tubes, rods, threads, strings, etc. and also the coating of fabric woven from non-fibrous threads or strings, or other fabric whose surface has been treated so as to be substantially free from projecting fibers.

I claim:

Article of manufacture suitable for electrical insulation comprising a cellulosic base material free from projecting fibres and a coating for said base material of an inherently flexible-phenolic resinoid reacted by the action of heat to a uniform non-porous adhering film, said article being characterized by a dielectric strength in excess of 1000 volts per mil.

HOWARD L. BENDER.